US009513662B2

United States Patent
Chin et al.

(10) Patent No.: US 9,513,662 B2
(45) Date of Patent: Dec. 6, 2016

(54) SYSTEM AND METHOD FOR POWER MANAGEMENT

(71) Applicant: Intel Corporation, Santa Clara, CA (US)

(72) Inventors: Jennifer Chin, Sugai Ara (MY); Su Wei Lim, Klang (MY); Poh Thiam Teoh, Seri Damansara (MY); Ting Lok Song, Bayan Lepas (MY); Sun Zheng E, Balik Pulau (MY); Say Cheong Gan, Bukit Mertajam (MY); Sujea Lim, Bintangor (MY); Ming Yi Lim, Ayer Itam (MY)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 13/734,612

(22) Filed: Jan. 4, 2013

(65) Prior Publication Data

US 2014/0195830 A1 Jul. 10, 2014

(51) Int. Cl.
*G06F 1/00* (2006.01)
*G06F 1/16* (2006.01)
*G06F 1/32* (2006.01)

(52) U.S. Cl.
CPC .......... *G06F 1/1626* (2013.01); *G06F 1/3206* (2013.01); *G06F 1/3243* (2013.01); *Y02B 60/1239* (2013.01)

(58) Field of Classification Search
None
See application file for complete search history.

(56) References Cited

U.S. PATENT DOCUMENTS

| 2007/0162773 | A1 | 7/2007 | Krantz et al. | |
| 2008/0031270 | A1* | 2/2008 | Tran | H04L 49/352 370/419 |
| 2008/0235528 | A1 | 9/2008 | Kim et al. | |
| 2008/0307240 | A1 | 12/2008 | Dahan et al. | |
| 2009/0141186 | A1* | 6/2009 | Guo | G06F 3/14 348/739 |
| 2010/0081406 | A1* | 4/2010 | Tan | G06F 1/3287 455/218 |
| 2010/0205328 | A1 | 8/2010 | Howard | |
| 2011/0084685 | A1* | 4/2011 | Zhong | G06F 1/3203 324/76.11 |
| 2011/0246798 | A1 | 10/2011 | Bilgin et al. | |

FOREIGN PATENT DOCUMENTS

| TW | 200702673 | 1/2007 |
| TW | 201242316 A | 10/2012 |
| WO | WO 2014/107589 A1 | 7/2014 |

OTHER PUBLICATIONS

Office Action in TW Application No. 102148773, mailed on Apr. 22, 2015, English translation, 10 pages.
International Search Report and Written Opinion in International Application No. PCT/US2014/010199, mailed Jun. 13, 2014, 11 pages.

* cited by examiner

*Primary Examiner* — Kim Huynh
*Assistant Examiner* — Paul J Yen
(74) *Attorney, Agent, or Firm* — Patent Capital Group

(57) ABSTRACT

Particular embodiments described herein can offer a method for managing power for at least one processor that includes evaluating a plurality of ports associated with an electronic device; determining that a particular pin associated with at least one of the ports is not receiving a signal; disabling a squelch function associated with the electronic device; and gating power associated with a physical layer (PHY) of the electronic device.

18 Claims, 10 Drawing Sheets

16

| CONVENTIONAL HOT PLUG CAPABLE PCI EXPRESS PORT | mPHY POWER GATEABLE HOT PLUG CAPABLE PCI EXPRESS PORT |
|---|---|
| SHUT DOWN SQUELCH CIRCUIT FOR EVERY 12ms WHEN DEVICE IS UNPLUG | POWER GATE mPHY WHEN DEVICE IS UNPLUG AND CLKREQ# ON IS DE-ASSERTED |

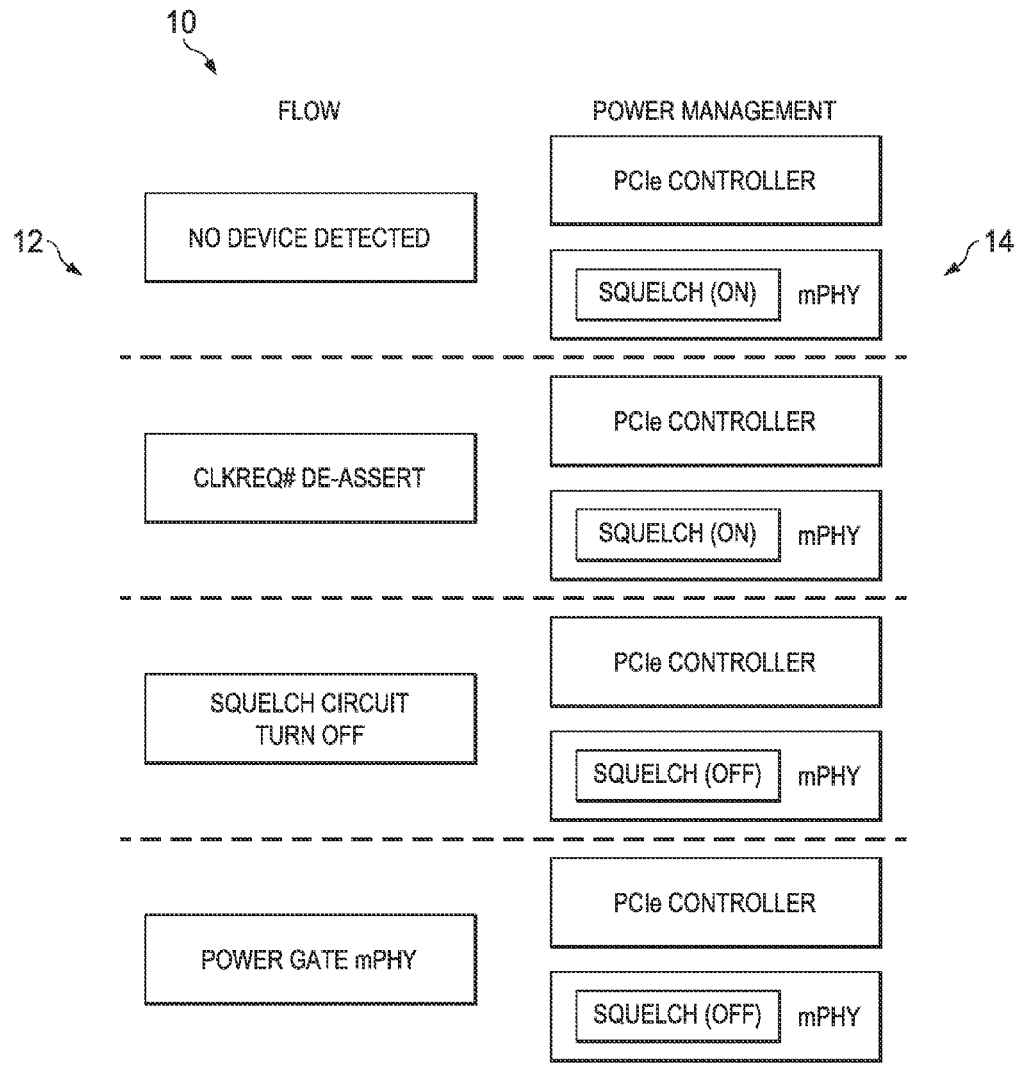

SYSTEM AND METHOD FOR POWER MANAGEMENT

TECHNICAL FIELD

Embodiments described herein generally relate to power management in a processor environment.

BACKGROUND

As electronic apparatuses become more complex and ubiquitous in the everyday lives of users, more and more diverse requirements are placed upon them. In addition, as capabilities of electronic apparatuses become more extensive, many users have become reliant on the enhanced performance such capabilities provide. As these aspects of electronic apparatuses have evolved, there has become an increasing need for reducing power consumption. However, under many circumstances, reducing power consumption may sacrifice performance. Therefore, it will be highly beneficial for a user to be able to have the desired performance when it matters the most to them, and optimize power performance during circumstances where performance may be less important to them. For example, many electronic apparatuses can operate in different power states (e.g., sleep states, idle states, etc.). In certain cases, unused resources can be turned off opportunistically. The significance of these activities can depend on the scope of resources available for minimizing power consumption.

BRIEF DESCRIPTION OF THE DRAWINGS

Embodiments are illustrated by way of example and not by way of limitation in the FIGURES of the accompanying drawings, in which like references indicate similar elements and in which:

FIG. 1 is a flow diagram illustrating operations associated with power gating according to at least one example embodiment of the present disclosure;

FIG. 2 is a simplified table illustrating a comparison associated with at least one example embodiment of the present disclosure;

Figure 3:
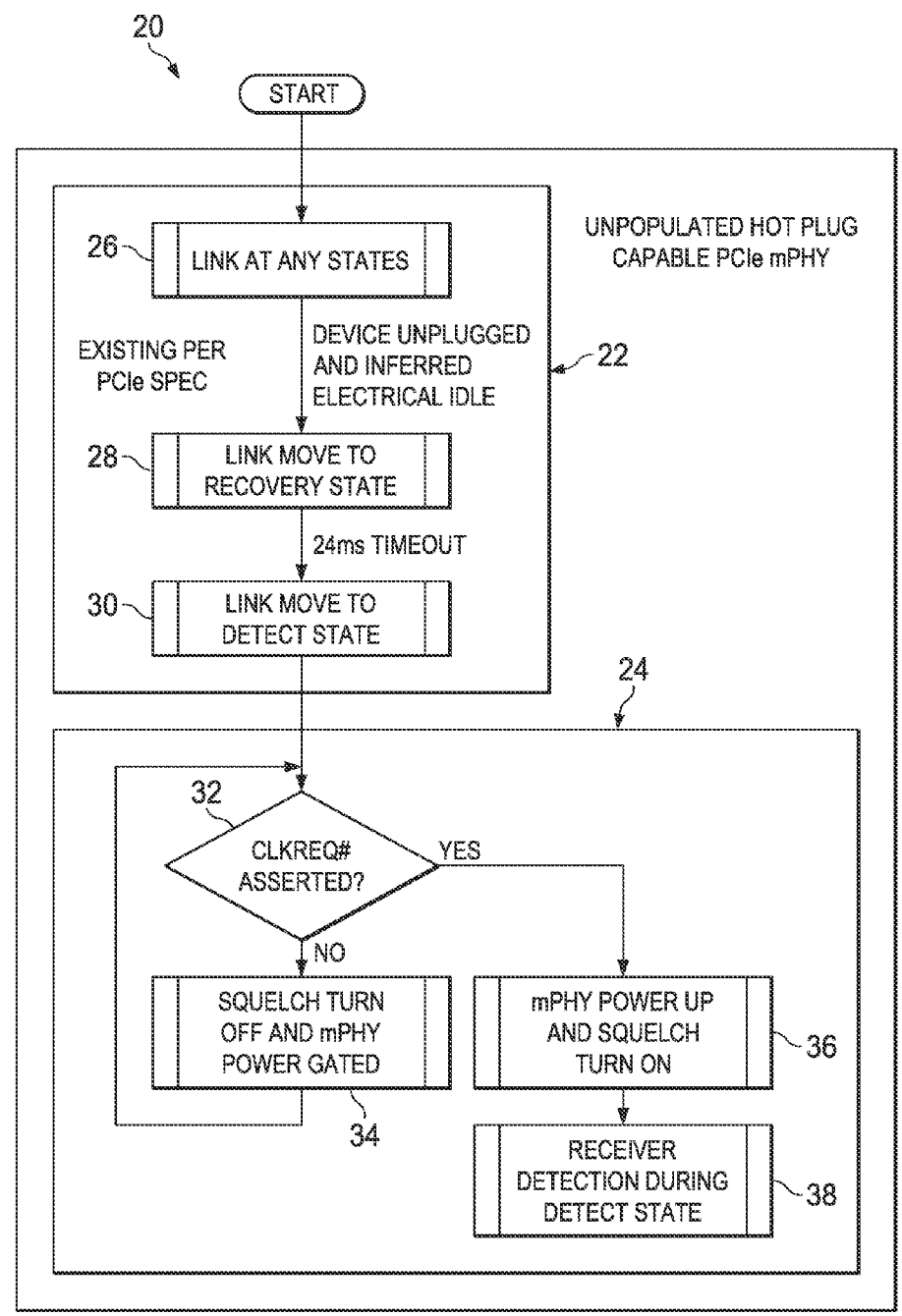
FIG. 3 is a block diagram illustrating components associated with determining latency tolerance according to at least one example embodiment.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features. It should be understood that terms such as "first", "second", etc. are merely used for differentiation purposes, and do not denote any sequential relationship, chronological relationship, and/or the like.

FIG. 1 is a block diagram illustrating components associated with providing power management according to at least one example embodiment. The examples of FIG. 1 are merely examples of components associated with providing power management, and do not limit the scope of the claims. For example, operations attributed to a component may vary, the number of components may vary, the composition of a component may vary, and/or the like. For example, in some example embodiments, operations attributable to one component of the example of FIG. 1 may be allocated to one or more other components.

In electronic devices, there is often a tradeoff between power saving and performance. Modern computer systems are typically formed of many semiconductor components that can communicate together via various interconnects such as those that are present on a circuit board. One common such interconnect mechanism (e.g., for incorporating various peripheral devices) is a Peripheral Component Interconnect Express (PCIe™) protocol in accordance with links based on the PCIe™ Specification (e.g., version 4.0, published on Nov. 29, 2011 (hereafter the PCIe™ Specification)). Note that the present disclosure is applicable to any version of the PCIe Specification. The interconnect can be formed of multiple layers, including a transaction layer, a link layer, and a physical layer (PHY). To reduce power consumption when communications are not occurring on a given interconnect, various mechanisms can be provided. If no communications are likely to occur for some time, the interconnect can be placed in a low-power state in which various interconnect circuitry can be disabled.

Typically, to determine when impending PCIe™ signaling is about to occur (e.g., when in an idle/sleep condition), squelching is a PCIe™ physical layer input/output (I/O) function to detect such signaling. Squelch logic attempts to detect voltage in receive pins of the interconnect to sense activity and prepare a link layer transaction state machine for proper operation to exit from the electrical state (EL) or lower power state. The squelch logic in the I/O circuit typically includes analog differential amplifiers, integrators, and other miscellaneous digital logic. The PHY Interface for the PCIe Architecture (PIPE) is to standardize the interface between the PCIe MAC implementation and the PCIe PHY implementation. Such PHYs can be delivered as discrete integrated circuits, macrocells, or for inclusion in any suitable processing designs, and, further, is known as modular PHY (mPHY) in this context.

Most electronic device manufacturers are aggressively seeking to reduce power during various states. For example, in achieving a reduction of idle power, unused logics are turned off opportunistically. The PCIe root ports can account for 12 out of 14 ports. Hence, significant savings can be achieved by effectively addressing these ports (e.g., turning off at least part of the PCIe lanes). In certain example embodiments presented herein, the architecture of FIG. 1 can provide a mPHY power gating capability for unpopulated hot plug capable PCIe ports. Power gating is a technique used in integrated circuit design to reduce power consumption by shutting off the flow of current to blocks of the circuit that are not currently in use. Power gating typically affects design architecture more than clock gating. It increases time delays, as power gated modes have to be safely entered and exited. Architectural tradeoffs exist between designing for the amount of leakage power saving in low-power modes and the energy dissipation to enter and exit the low-power modes. Shutting down the blocks can be accomplished either by software or hardware, where driver software can schedule the power down operations.

In terms of its applicability, power gating can be valuable in mobile electronic devices that are dockable to docking stations. The docking interconnect can be PCIe and if the electronic device is undocked, then the lanes are unpopulated. Hence, that particular PCIe port's mPHY can be power gated. Once a user seeks to dock it to the docking station for charging or for connecting to an external monitor, then the PCIe root port can be able to power up the mPHY.

It should be noted that certain activities discussed in this disclosure may violate one or more of the provisions of the PCIe Specification, which can require receiver detection to be performed every 12 milliseconds (ms) for an unpopulated PCIe port that are hot plug capable. However, at least one embodiment discussed herein can provide the capability to power gate the entire mPHY. This is because the architecture can make use of the clock request (CLKREQ#) pin to detect the hot plug event to power up the mPHY. Hence, there would be no need to perform the 12 ms receiver detection in certain cases. In general, the CLKREQ# signal is an open drain, active low signal that can be driven low by the PCI Express Mini Card function to request that the PCIe reference clock be available (active clock state) in order to allow the PCIe interface to send/receive data.

FIG. 1 is a simplified flow diagram illustrating an example system 10 for providing power management for at least one processor. In general, FIG. 1 is divided into two segments: the first segment associated with an operational flow 12 and a second segment associated with power management 14. More specifically, FIG. 1 represents a flow diagram for power gating mPHY for unpopulated PCIe ports when the CLKREQ# is tri-stated. The CLKREQ# can be used in some implementations by the downstream device to cause the upstream device to stop signaling on the REFCLK. When the REFCLK is stopped, this can typically cause the CLK input to the PIPE PHY to stop as well. The PCIe Card Electromechanical (CEM) Specification allows the downstream device to stop the REFCLK when the link is in either layer 1 (L1) or layer 2 (L2) states. The architecture of FIG. 1 can enable unpopulated hot plug capable PCIe ports' mPHY to be power gated.

In operation, the PCIe root port can sample the CLKREQ#. The CLKREQ# may be undriven or tri-stated. If there is no device populating the PCIe lanes, then the PCIe root port can disable the squelch function and power gate the mPHY. The flow diagram of FIG. 1 denotes the flow of the unpopulated PCIe ports that can perform squelch disable and mPHY power gating.

In certain example embodiments, squelch logic of an interconnect can be selectively enabled/disabled to reduce power consumption. More specifically, in various embodiments a semiconductor device (such as a processor including an integrated memory controller and I/O controller) may have internal (i.e., on-die) interconnects between processor circuitry and the controller circuitries. Such interconnect circuitry may include squelch control logic to selectively enable or disable squelch circuitry associated with one or more lanes of a given interconnect. In various embodiments, as will be discussed below, such squelch control can be dynamic and can be controlled both via hardware and software to provide improved reliability, while reducing power consumption.

Turning to FIG. 2, FIG. 2 is a simplified table 16 illustrating a comparison associated with at least one example embodiment of the present disclosure. More specifically, the comparison is being made between the conventional hot plug capable PCIe port and the power gateable hot plug capable PCIe port according to various embodiments, as discussed in detail below.

FIG. 3 is a simplified flowchart 20 illustrating several components associated with an unpopulated hot plug capable PCIe mPHY. At 26, the link is identified in any state. A current device is unplugged and an electrical idle is inferred. At 28, the link can move to a recovery state. A 24 ms, the timeout is subsequently incurred causing the link to be moved to a detect state at 30. From 26 to 28 to 30, the link's state transition is guided by the PCIe Specification requirement (shown generally at an arrow 22) when the device is unplugged. Note that a general arrow 24 depicts additional activities that depart from the existing PCIe Specification. At 32, a query is made as to whether the clock request (CLKREQ#) signal has been asserted, where if it has not, then this particular flow would move to 34, where the squelch is turned off and the mPHY is power gated. If the clock request (CLKREQ#) signal has been asserted, then the mPHY is powered up, and the squelch is turned on at 36. Additionally, at 38, the receiver detection during the detect state is triggered. Note that the unpopulated PCIe ports currently only perform clock gating. Certain embodiments presented herein can extend this further by turning off the squelch function and then power gating the mPHY. In at least one embodiment, the unpopulated hot plug capable PCIe ports can perform squelch turn off and mPHY power gating during CLKREQ# tri-stated (de-asserted).

A significant power savings can be achieved from the squelch disable activity and from the mPHY power gating when CLKREQ# is tri-stated or undriven on unpopulated PCIe ports. This could allow, for example, a given electronic device's PCIe root port and I/O controller hub to achieve a higher power saving.

Figure 4:
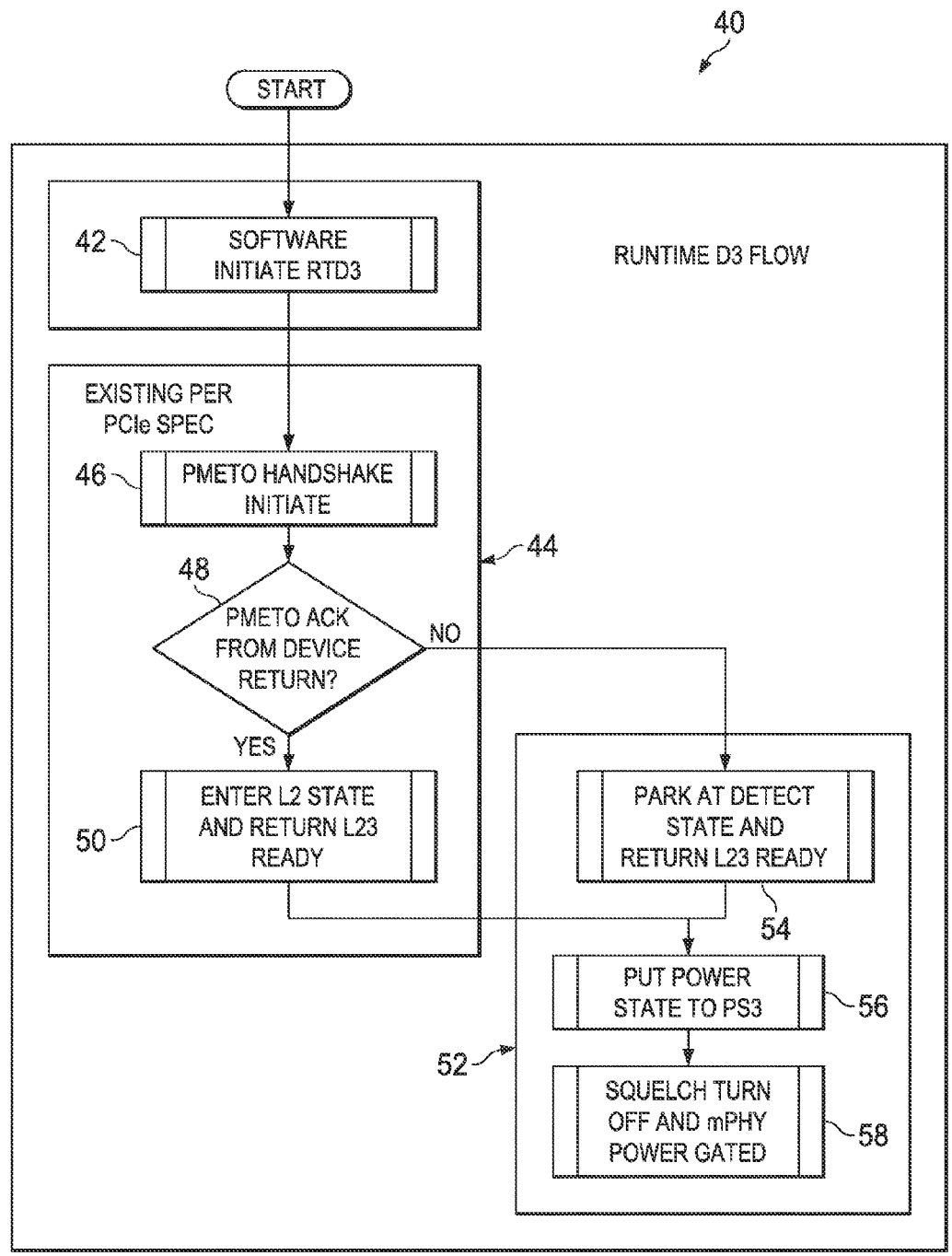
FIG. 4 is a flow diagram illustrating runtime operations according to at least one example embodiment.

FIG. 4 is a simplified flow diagram 40 illustrating another aspect associated with the present disclosure. Before reviewing that flow, it is important to understand some of the states and components associated with the architecture. 'D0I' is the device power state in which a device is on and running. It is receiving full power from the system and it is delivering full functionality to the user. Devices previously support this power state. 'D0active' is the device power state where the device has been configured, enabled by software, and it is functional. 'D3hot' is the device power state that occurs when a device transitions to D3, yet still has Vcc applied. 'D3cold' is the device power state that occurs when a device transitions to D3, but Vcc is not applied. The Host Bus Adapter (HBA) is used to communicate with a storage device. 'Runtime D3' (RTD3) refers to the placement of a device into D3hot/cold, while the rest of the platform remains in a S0 state.

'S0' is the system power state and while the system is in the S0 state, it is operating in the system working state. The device states are individually managed by the operating system software and can be in any device state (D0 or D3). 'S3' is the system power state (also referred to as system sleeping state). While the system is in S3, the processors are not executing instructions and power is usually removed from the devices. Some system BIOS is usually used to initialize the system on transition to S0. 'S4' is the system power state (also referred to as hibernation). While the system is in S4, the processors are not executing instructions and power is usually removed from the devices. System BIOS is used to initialize the system on transition to S0 (i.e., Power-On Self-Test (POST)).

In operation, RTD3 constitutes the hardware and software enhancements to put the PCIe root port into the D3hot and to put the device into the D3hot/D3cold state when the system is in S0 (e.g., when the device is no longer needed by software). In RTD3, the mPHY can be dynamically power gated. The receiver (RX) termination should remain enabled, but the transmitter (TX) common mode can be turned off. Each of the PCIe root ports has a RTD3-entry configuration bit to allow Advanced Configuration and Power Interface (ACPI) software to initiate the PME_Turn_Off/PME_TO_Ack handshake for that particular port to put the link into the L2/L3 ready state (e.g., independent of the other ports). The bit is set by software to initiate the PME_Turn_Off handshake and it is cleared by hardware on entry to the L2/L3 ready state.

Returning to FIG. 4, this particular flow may begin at 42, where software initiates an RTD3. At 46, a PME TO handshake is initiated. At 48, a determination is made whether the PME TO acknowledgment (ACK) from the electronic device is returned. At 50, the system enters into an L2 state and returns to the L2/L3 ready state. Note that these activities exist per the existing PCIe Specification, as shown generally by an arrow 44. A separate arrow 52 represents additional features to be provided in conjunction with the present disclosure. At 54, the link state is parked at the detect state due to the device not returning the PME TO acknowledgement and the system returns to the L2/L3 ready. At 56, the power state is moved to PS3 and, at 58, the squelch is turned off and the mPHY is power gated.

Figure 5:
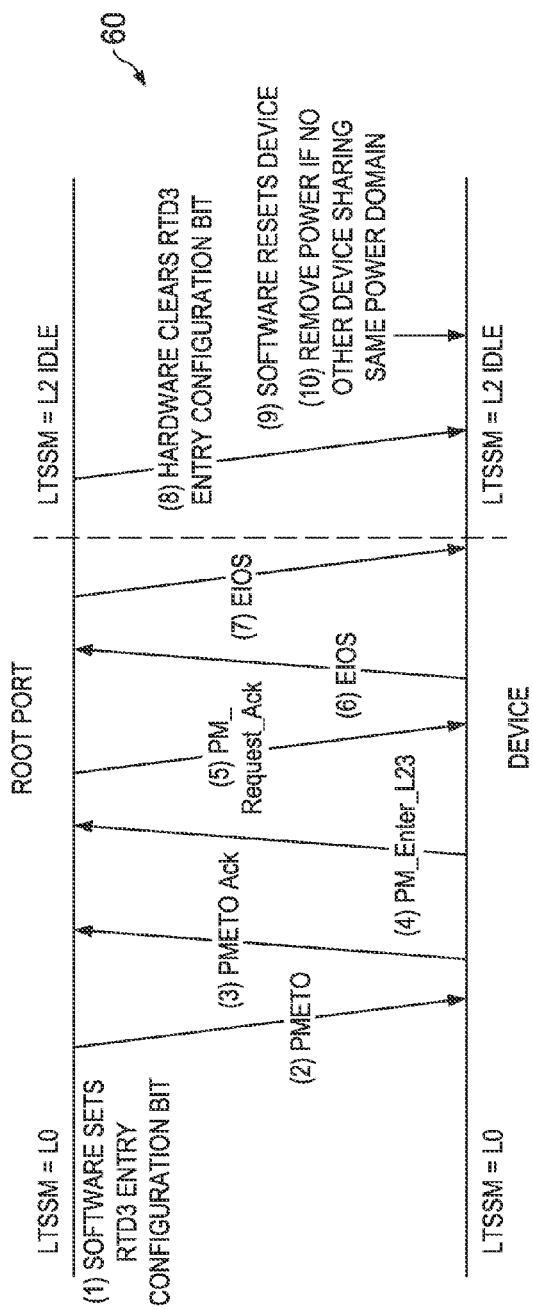
FIG. 5 is another flow diagram illustrating operations according to at least one example embodiment.

FIG. 5 is another flow diagram 60 illustrating operations according to at least one example embodiment. More specifically, FIG. 5 illustrates one possible RTD3 entry flow. In operation, when the entry is successful upon the clearing of the configuration bit, any suitable software can instruct the power management controller (PMC) to assert a PCIe reset (PERST#) to the corresponding device. Subsequently, the device power can be removed and the device transitions into a D3cold state, as is being illustrated in FIG. 5. If the device is in D3cold, the device can initiate the exit from the RTD3 by asserting the WAKE# signal. The assertion of the WAKE# can cause the PMC to generate a SCI to notify the relevant software to restore the device power and to sequence the device out of the reset. Similarly, the RTD3 exit can also be initiated by the host software. The device can then end up in a D0 uninitialized state. As part of the exit sequence, software can set another RTD3-exit configuration bit to move the PCIe root port LTSSM from the L2/L3 ready state to detect state, after which the bit can be cleared.

In the event of a link error or device hot-removal during active RTD3 entry, the root port may not be able to receive the PME_TO_Ack or PM_Enter_L23 or Electrical Idle Ordered set (EIOS) while sequencing into L2.Idle. Due to the failure to reach the L2/L3 ready state, hardware may not be able to clear the RTD3-entry configuration bit. Hence, hardware can rely on a L2/L3-entry break-path mechanism to ensure that the RTD3-entry configuration bit can be cleared to prevent a software freeze condition, or software running into an infinite-polling loop. As per the PCIe Specification, a suitable mechanism (e.g., hardware or software) can implement a timeout after waiting for a certain amount of time in the event of link error (or device hot-removal), while the RTD3 entry is actively in progress. Subsequently, it proceeds as if the PME_Turn_Off message had been received and the links put into the L2/L3 ready state.

Figure 6:
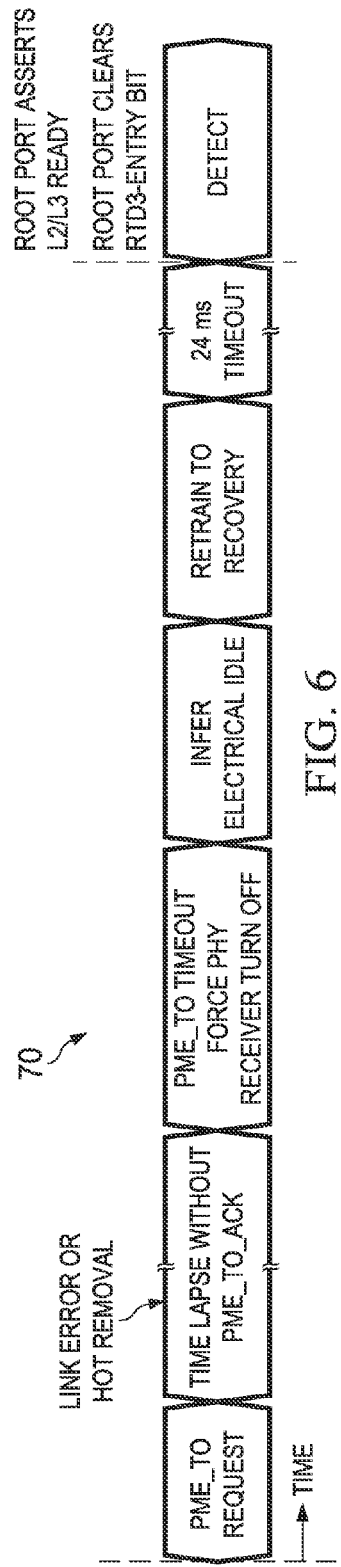
FIG. 6 is yet another flow diagram illustrating operations according to at least one example embodiment.

FIG. 6 is another flow diagram 70 illustrating operations according to at least one example embodiment. More specifically, FIG. 6 illustrates an example RTD3 entry flow when link encounters error, or when a device hot-removal occurs, while RTD3 is actively in progress. In the event of link error or device hot-removal during active RTD3 entry, hardware cannot arbitrarily indicate L2/L3 ready without arriving at a deterministic LTSSM state and clear the RTD3-entry configuration bit. Certain example features of the present disclosure can ensure that the root port arrives at the detect state before indicating the L2/L3 ready and clearing the RTD3-entry configuration bit. Once PME_TO timeout happens, the root port can force the receiver in the mPHY to turn off, hence, cutting off any incoming data from the device. With this, the root port can transition from L0 to recovery due to the inferred electrical idle (and subsequently arriving at detect naturally after the 24 ms timeout (per the PCIe Specification) due to the failure to receive any training sequence from the device). In terms of the link level activities related to the transition from a sleep (L2) or powered-off (L3) condition to a powered-on (L0 link state), for a PCIe platform that has been powered-off, the PCIe devices and associated links have one path to transition from the L3 link state to the L0 link state.

Figure 7:
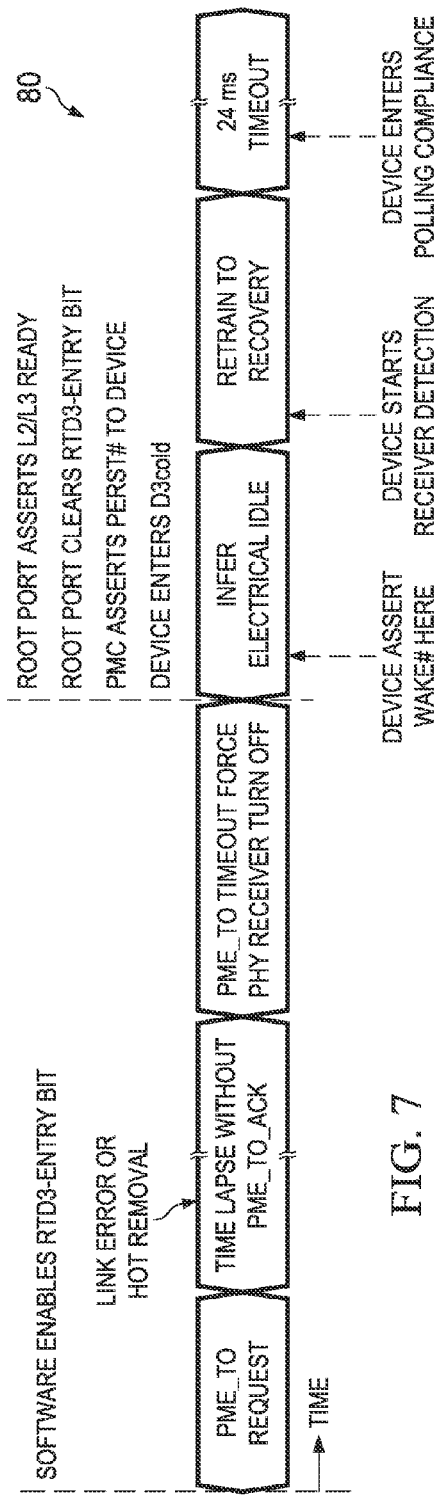
FIG. 7 is still another flow diagram illustrating operations according to at least one example embodiment.

FIG. 7 is another flow diagram 80 illustrating operations according to at least one example embodiment. More specifically, FIG. 7 helps to illustrate how the root port and the device become out-of-sync in the RTD3 entry flow when the link encounters an error or when a device hot-removal occurs while RTD3 is actively in progress. If the hardware randomly indicates L2/L3 ready and clears the RTD3-entry configuration bit immediately upon PME_TO timeout, the chances are high that the PCIe root port and the device may potentially get out-of-sync if the device wakes immediately. After the root port clears the RTD3-entry configuration bit and the software resets and removes power from device, the root port may still be in a transitional state back to the detect state due to PCIe Specification defined timeout. While that is in progress, the device may assert WAKE# to exit D3cold. At this stage, the software can restore power and remove the reset on the device. The device can detect the root port and move into the polling state, but the root port may be still transitioning back to the detect state. This causes the PCIe root port and the device states to be out-of-sync and this may cause undesired functional behavior (e.g., the device entering the polling compliance).

The PME_TO timeout mechanism is the typical flow defined by the PCIe Specification for a platform Sx entry. The RTD3 and Sx entry flow are different in the sense that the Sx entry asserts a common PERST# to both the PCIe root port and the device after the root port has indicated L2/L3 ready to PMC. Hence, there is no constraint for the Sx entry flow to arrive at a deterministic LTSSM state before signaling L2/L3 ready because the root port can be reset at the end of Sx entry anyway. In contrast, RTD3 is a new initiative to put the PCIe root port into D3hot and the device into the D3hot/D3cold state even when the system is in S0 and, hence, the root port will not be reset after a successful entry into RTD3.

In the event of PME_TO timeout due to link error or device hot-removal and the hardware randomly indicates L2/L3 ready to clear the RTD3-entry configuration bit immediately, there is a possibility that the PCIe root port and the device states may possibly get out-of-sync if the device wakes immediately because the root port does not get reset after a successful entry into RTD3. Certain embodiments of the present disclosure can ensure that the root port reaches the detect state before indicating L2/L3 ready and clearing the RTD3-entry configuration bit. Once the PME_TO timeout occurs, the root port can force the receiver in the mPHY to turn off, hence cutting off any incoming data from the device. Subsequently, the root port can transition from L0 to a recovery due to the inferred electrical idle, finally arriving at detect naturally after 24 ms timeout per the PCIe Specification due to a failure to receive any training sequence from the device.

In more general terms, RTD3 reflects the initiative to put the PCIe root port into the D3hot and the device into the D3hot/D3cold state even when the system is in S0. RTD3 enables the mPHY to be dynamically power gated. The RX termination should remain enabled, but the TX common mode can be turned off, while the squelch detection circuitry can be completely turned off. Power can be removed from the device to reside in the D3cold state, while the PCIe root port is remains in S0. This operations disclosed herein complete the RTD3 entry flow in the event of link error or the device being hot-removed, on top of the ideal RTD3 entry flow where the PCIe root port and the device sequence graciously into the L2/L3 ready state. This disclosure ensures that software does not get into an infinite-polling loop, as a consequence of hardware being unable to complete the RTD3 entry flow into the L2/L3 ready state.

Figure 8:
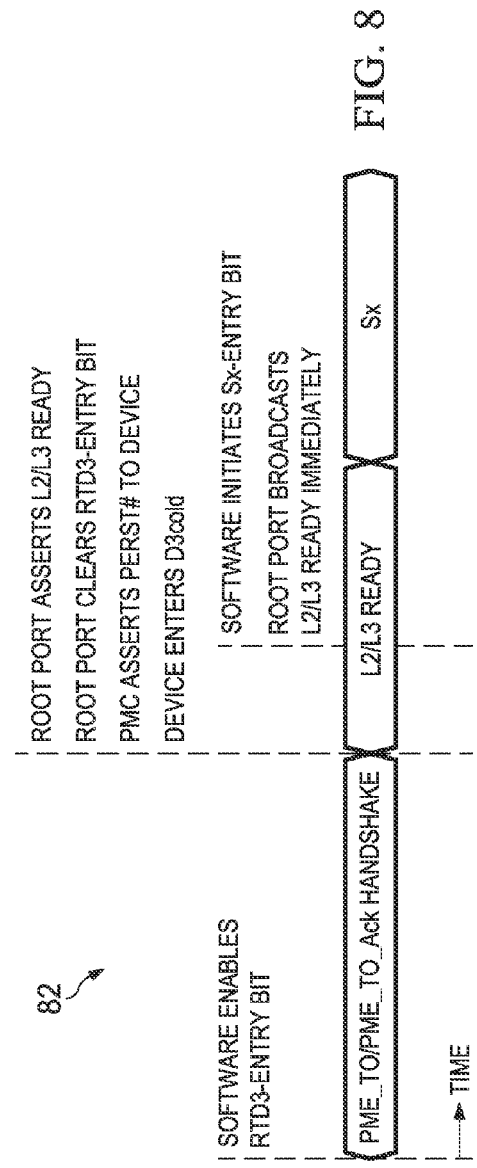
FIG. 8 is yet still another flow diagram illustrating operations according to at least one example embodiment.

FIG. 8 is yet still another flow diagram 82 illustrating operations according to at least one example embodiment. The device D3 state represents the non-functional device power management state where the entry and exit from this state is fully managed by software. The main power can be removed from the device in this state. Conventionally, the device is put into the D3 state as part of the flow to transition the system from S0 to the Sx system sleep state. RTD3 puts the PCIe root port into D3hot and the device into D3hot/D3cold state even when the system is in S0. Each of the PCIe root port has a RTD3-entry configuration bit to allow ACPI software to initiate PME_Turn_Off/PME_TO_Ack handshake for that particular port to put the link into L2/L3 ready state, independent of the other ports. The bit is set by software to initiate PME_Turn_Off handshake and it is cleared by hardware on entry to L2/L3 ready state. When entry is successful upon the clearing of the configuration bit, software can instruct the power management controller (PMC) to assert PERST# to the device, after which the device power can be removed and the device finally ends up in the D3cold state.

Once the device is in D3cold, the device can initiate exit from RTD3 by asserting the WAKE# signal. The assertion of WAKE# causes PMC to generate a SCI to notify the relevant software to restore the device power and to sequence the device out of reset. Similarly, the RTD3 exit can also be initiated by the host software. The device then ends up in the D0 uninitialized state. As part of the exit sequence, software can set another RTD3-exit configuration bit to move the PCIe root port LTSSM from the L2/L3 ready state to the detect state, after which the bit can be cleared.

The RTD3 software entry and exit flows can involve multiple software components such as the Operating System, Device Drivers, Bus Drivers, optional Platform Drivers and ACPI software and could vary based on particular Operating Systems. As a result, the software programming of Sx entry and RTD3 entry/exit events could collide if not managed in sequence by the different levels of software. This disclosure describes the hardware handling of the Sx entry and the RTD3 entry/exit events occurring in parallel. There are a few combinations of Sx entry clashing with the RTD3 entry/exit events that require specific hardware handling to ensure the smooth progress of each event. For example, while a root port is already in the L2/L3 ready state due to the RTD3 entry, software programs the Sx entry. In this case, the root port that is already in RTD3 can return the acknowledgement indicating the L2/L3 ready to the PMC. The acknowledgement can be aggregated prior to being returned to the PMC, as illustrated in FIG. 8.

Figure 9:
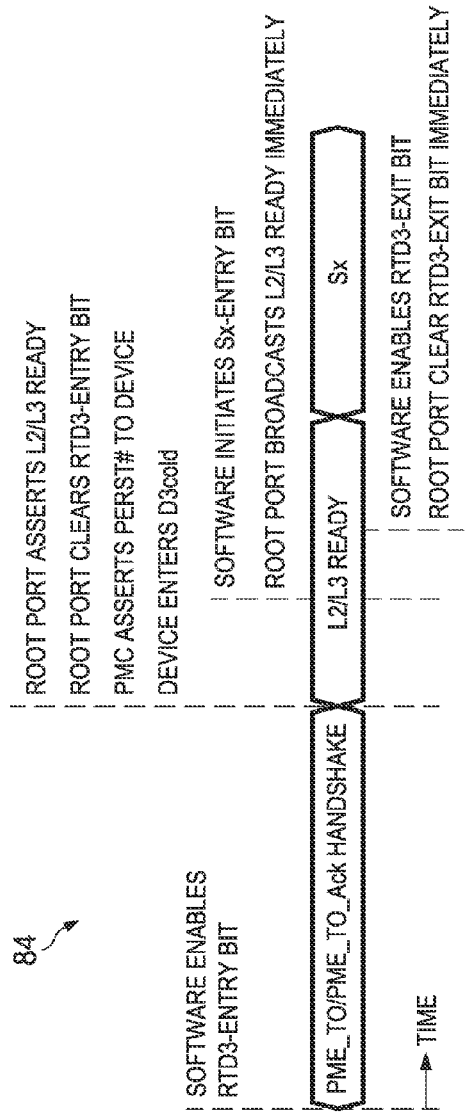
FIG. 9 is yet still another flow diagram illustrating operations according to at least one example embodiment.

FIG. 9 is yet still another flow diagram 84 illustrating operations according to at least one example embodiment. Related to the first case above, even if software erratically programs RTD3-exit configuration bit, the root port should not exit the L2/L3 ready state. In fact, the RTD3 exit configuration bit can be cleared immediately. The root port that is already in RTD3 can immediately return acknowledgement indicating the L2/L3 ready to the PMC, as shown in FIG. 9.

Figure 10:
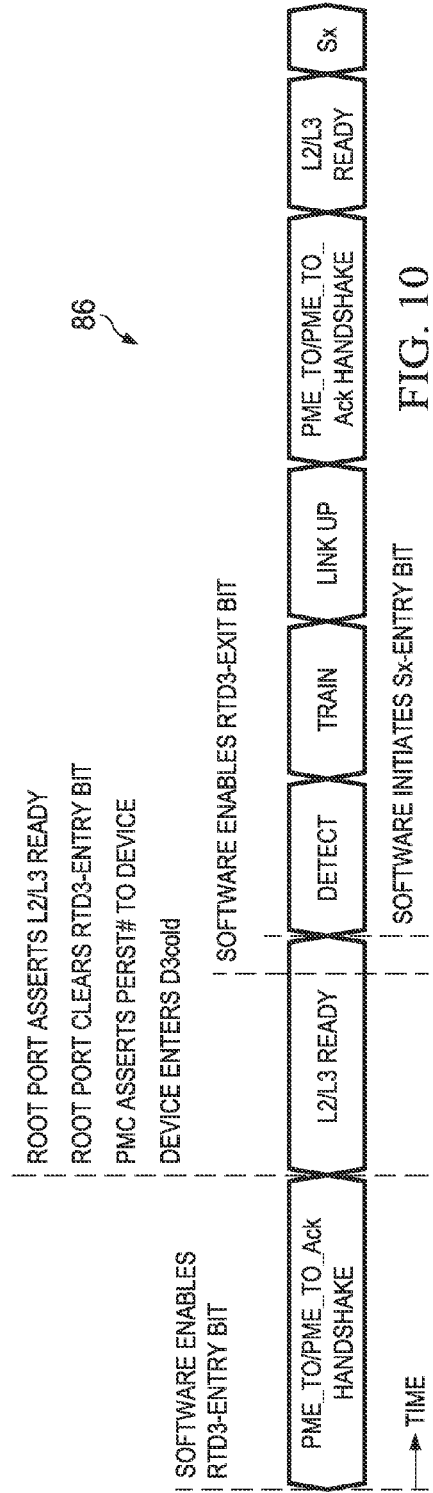
FIG. 10 is yet still another flow diagram illustrating operations according to at least one example embodiment.
Figure 11:
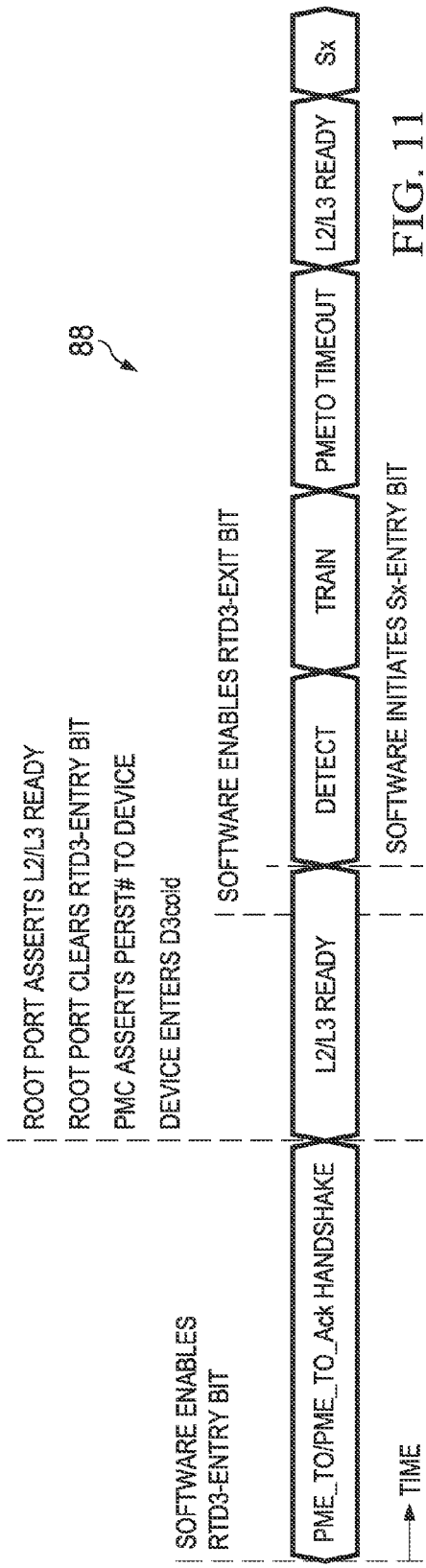
FIG. 11 is yet still another flow diagram illustrating operations according to at least one example embodiment.

Additionally, while the device is already in D3cold after a successful RTD3 entry, software can program the RTD3 exit configuration bit. In the middle of exiting RTD3, software programs the Sx entry. In this case, the root port should ensure that it sequences to complete the RTD3 exit appropriately and then retrain back to link-up, after which the root port can initiate PME_Turn_Off/PME_TO_Ack handshake to re-enter L2/L3 ready state for the Sx entry. If PME_TO timeout happens before the root port could request for PME_Turn_Off, then it proceeds as if the PME_Turn_Off message had been received and the links put into the L2/L3 ready state, as shown in FIGS. 10-11 that represent respective flow diagrams 86 and 88.

Figure 12:
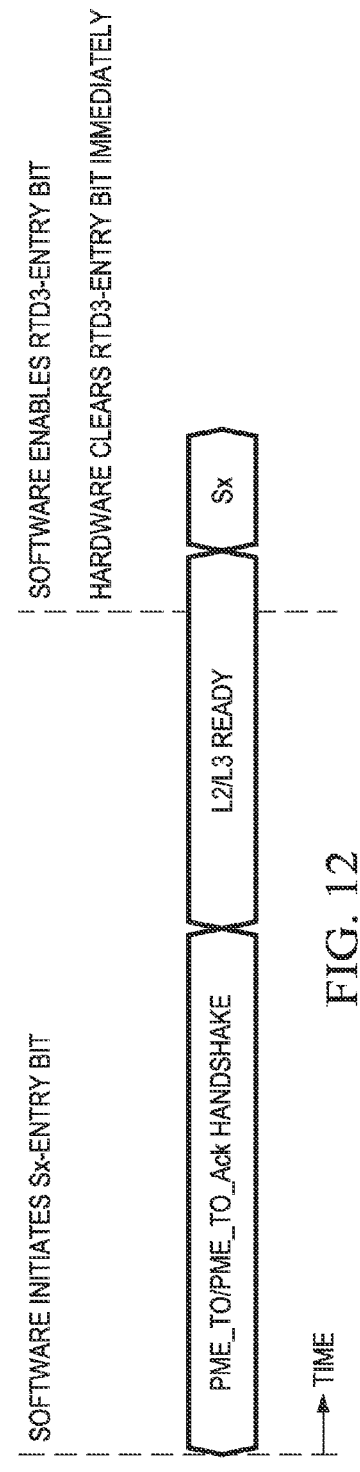
FIG. 12 is yet still another flow diagram illustrating operations according to at least one example embodiment.
Figure 13:
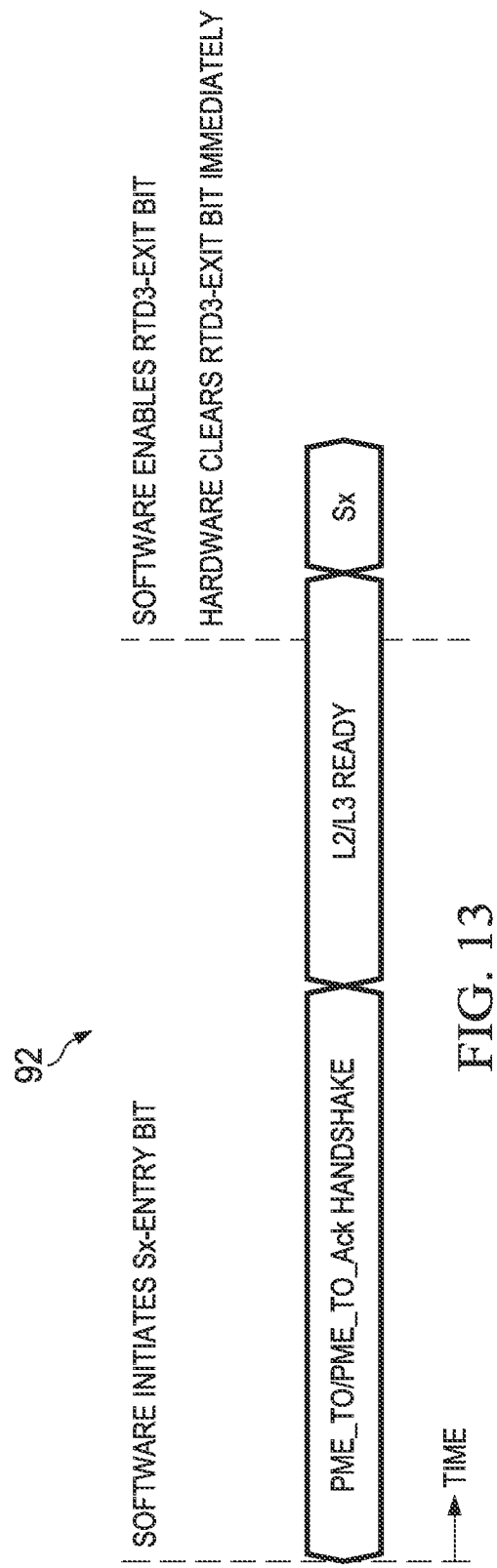
FIG. 13 is yet still another flow diagram illustrating operations according to at least one example embodiment.

FIG. 12 is yet still another flow diagram 90 illustrating operations according to at least one example embodiment. FIG. 13 is yet still another flow diagram 92 illustrating operations according to at least one example embodiment. If software erratically programs the RTD3-exit configuration bit while the system is progressing into Sx with the root port and the device already in D3 and asserting L2/L3 ready, the root port should clear the RTD3-entry configuration bit immediately, as illustrated in FIG. 12. If software erratically programs the RTD3-exit configuration bit while the system is progressing into Sx with the root port and the device already in D3 and asserting the L2/L3 ready, the root port should not exit the L2/L3 ready state. In fact, the RTD3 exit configuration bit can be cleared immediately, as shown in FIG. 13. While Sx is a conventional flow to put the root port and the device into D3 by transitioning from S0 to Sx system sleep state, RTD3 is a new initiative to put the PCIe root port into D3hot and the device into D3hot/D3cold state even when the system is in S0. Conventional platforms only support Sx entry that puts the root port and the device into D3 via the PME_Turn_Off/PME_TO_Ack handshake. RTD3 is a new power-saving scheme that does not exist in standard chipset systems. Hence, there is no such issue that creates a race or a collision condition between the Sx and the RTD3 entry/exit in the existing chipset architectures.

Figure 14:
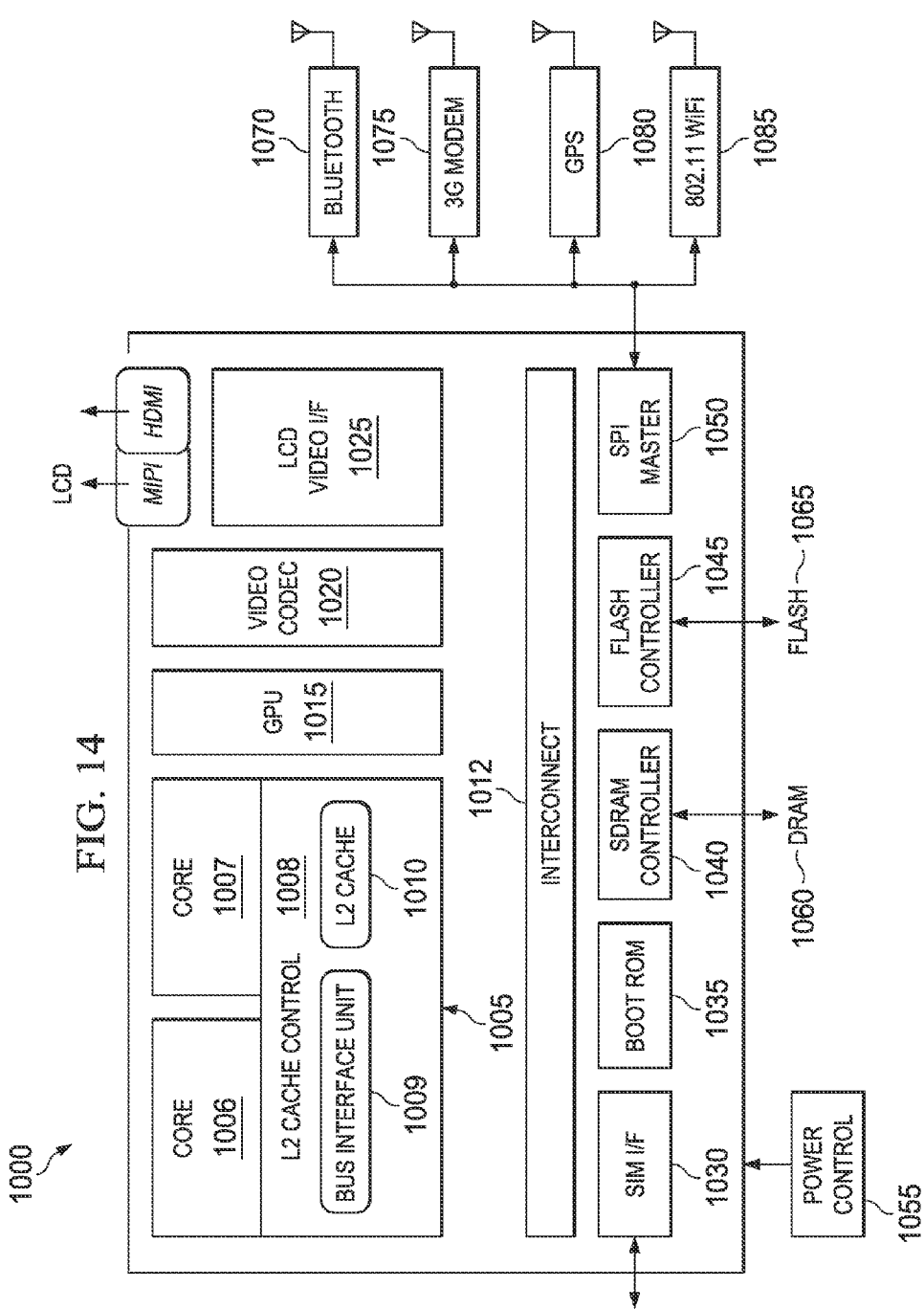
FIG. 14 is a simplified block diagram associated with an example ARM ecosystem system on chip (SOC) of the present disclosure.

FIG. 14 is a simplified block diagram associated with an example ARM ecosystem SOC 1000 of the present disclosure. At least one example implementation of the present disclosure includes an integration of the power savings features discussed herein and an ARM component. For example, the example of FIG. 14 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), any type of touch-enabled input device, etc.

In this example of FIG. 14, ARM ecosystem SOC 1000 may include multiple cores 1006-1007, an L2 cache control 1008, a bus interface unit 1009, an L2 cache 1010, a graphics processing unit (GPU) 1015, an interconnect 1012, a video codec 1020, and a liquid crystal display (LCD) I/F 1025, which may be associated with mobile industry processor interface (MIPI)/high-definition multimedia interface (HDMI) links that couple to an LDC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth 1070, a 3G modem 1075, a global positioning system (GPS) 1080, and an 802.11 WiFi 1085.

In operation, the example of FIG. 14 can offer processing capabilities, along with relatively low-power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 15:
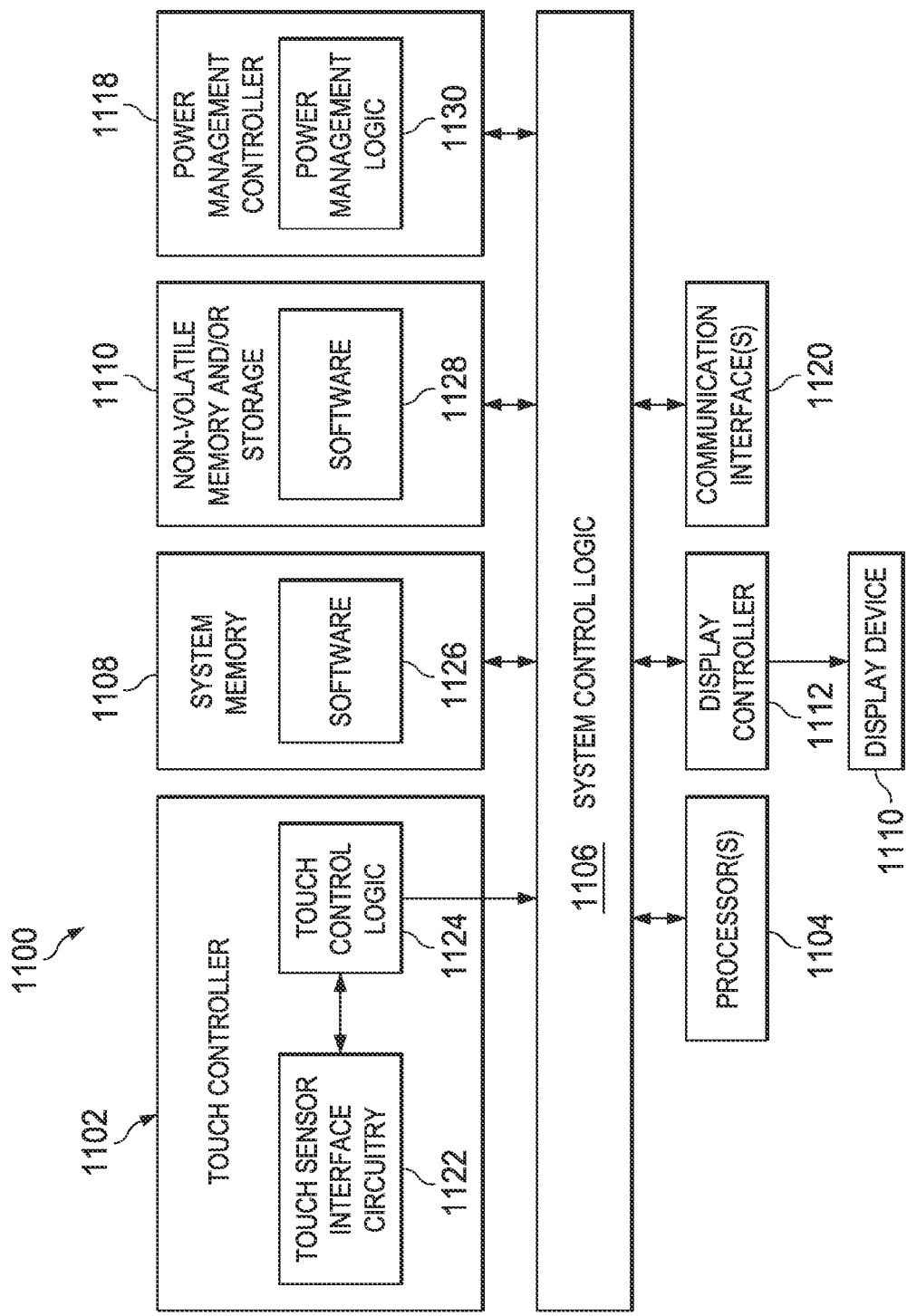
FIG. 15 is a simplified block diagram illustrating example logic that may be used to execute activities associated with the present disclosure.

FIG. 15 is a simplified block diagram illustrating potential electronics and logic that may be associated with any of the power saving operations discussed herein. In at least one example embodiment, system 1100 includes a touch controller 1102, one or more processors 1104, system control logic 1106 coupled to at least one of processor(s) 1104, system memory 1108 coupled to system control logic 1106, non-volatile memory and/or storage device(s) 1110 coupled to system control logic 1106, display controller 1112 coupled to system control logic 1106, display controller 1112 coupled to a display, power management controller 1118 coupled to system control logic 1106, and/or communication interfaces 1120 coupled to system control logic 1106.

System control logic 1106, in at least one embodiment, includes any suitable interface controllers to provide for any suitable interface to at least one processor 1104 and/or to any suitable device or component in communication with system control logic 1106. System control logic 1106, in at least one example embodiment, includes one or more memory controllers to provide an interface to system memory 1108. System memory 1108 may be used to load and store data and/or instructions, for example, for system 1100. System memory 1108, in at least one example embodiment, includes any suitable volatile memory, such as suitable dynamic random access memory (DRAM) for example. System control logic 1106, in at least one example embodiment, includes one or more input/output (I/O) controllers to provide an interface to a display device, touch controller 1102, and non-volatile memory and/or storage device(s) 1110.

Non-volatile memory and/or storage device(s) 1110 may be used to store data and/or instructions, for example within software 1128. Non-volatile memory and/or storage device(s) 1110 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1118 may include power management logic 1130 configured to control various power management and/or power saving functions disclosed herein or any part thereof. In at least one example embodiment, power management controller 1118 is configured to reduce the power consumption of components or devices of system 1100 that may either be operated at reduced power or turned off when the electronic device is in the closed configuration. For example, in at least one example embodiment, when the electronic device is in a closed configuration, power management controller 1118 performs one or more of the following: power down the unused portion of the display and/or any backlight associated therewith; allow one or more of processor(s) 1104 to go to a lower power state if less computing power is required in the closed configuration; and shutdown any devices and/or components, such as keyboard 108, that are unused when an electronic device is in the closed configuration.

Communications interface(s) 1120 may provide an interface for system 1100 to communicate over one or more networks and/or with any other suitable device. Communications interface(s) 1120 may include any suitable hardware and/or firmware. Communications interface(s) 1120, in at least one example embodiment, may include, for example, a network adapter, a wireless network adapter, a telephone modem, and/or a wireless modem.

System control logic 1106, in at least one example embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1104 may be packaged together with logic for one or more controllers of system control logic 1106. In at least one example embodiment, at least one processor 1104 may be packaged together with logic for one or more controllers of system control logic 1106 to form a System in Package (SiP). In at least one example embodiment, at least one processor 1104 may be integrated on the same die with logic for one or more controllers of system control logic 1106. For at least one example embodiment, at least one processor 1104 may be integrated on the same die with logic for one or more controllers of system control logic 1106 to form a System on Chip (SoC).

For touch control, touch controller 1102 may include touch sensor interface circuitry 1122 and touch control logic

1124. Touch sensor interface circuitry 1122 may be coupled to detect touch input over a first touch surface layer and a second touch surface layer of display 11 (i.e., display device 1110). Touch sensor interface circuitry 1122 may include any suitable circuitry that may depend, for example, at least in part on the touch-sensitive technology used for a touch input device. Touch sensor interface circuitry 1122, in one embodiment, may support any suitable multi-touch technology. Touch sensor interface circuitry 1122, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 1124 may be coupled to help control touch sensor interface circuitry 1122 in any suitable manner to detect touch input over a first touch surface layer and a second touch surface layer. Touch control logic 1124 for at least one example embodiment may also be coupled to output in any suitable manner digital touch input data corresponding to touch input detected by touch sensor interface circuitry 1122. Touch control logic 1124 may be implemented using any suitable logic, including any suitable hardware, firmware, and/or software logic (e.g., non-transitory tangible media), that may depend, for example, at least in part on the circuitry used for touch sensor interface circuitry 1122. Touch control logic 1124 for one embodiment may support any suitable multi-touch technology.

Touch control logic 1124 may be coupled to output digital touch input data to system control logic 1106 and/or at least one processor 1104 for processing. At least one processor 1104 for one embodiment may execute any suitable software to process digital touch input data output from touch control logic 1124. Suitable software may include, for example, any suitable driver software and/or any suitable application software. As illustrated in FIG. 11, system memory 1108 may store suitable software 1126 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein. In addition, one or more blocks of one flow diagram may be combined with one or more blocks of another diagram.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

EXAMPLE EMBODIMENT IMPLEMENTATIONS

One particular example implementation may include an apparatus for managing power for at least one processor that includes means for evaluating (e.g., via a processor, software, circuitry, a hub, a controller, etc.) a plurality of ports associated with an electronic device; means for determining that a particular pin associated with at least one of the ports is not receiving a signal; means for disabling a squelch function associated with the electronic device; and means for gating power (e.g., over any suitable interface, link, bus, communication pathway, etc.) associated with a physical layer (PHY) of the electronic device.

Another particular example may include an apparatus for managing power for at least one processor that includes means for identifying (e.g., via a processor, software, circuitry, a hub, a controller, etc.) a power management event (PME) timeout; means for (e.g., via a processor, software, circuitry, a hub, a controller, etc.) directing a receiver in a physical layer (PHY) to turn off; means for transitioning from a powered-on link state to a recovery state; and means for resuming a detection state associated with a predetermined timeout associated with failing to receive a sequence from the electronic device.

Still another example embodiment may include an apparatus for managing power for at least one processor that includes means for providing a configuration bit of a root port; means for initiating (e.g., via a processor, software, circuitry, a hub, a controller, etc.) a power management event turn off/acknowledgment handshake signal for the root port for putting a corresponding link into layer 2/layer 3 (L2/L3) ready state; means for instructing (e.g., via a processor, software, circuitry, a hub, a controller, etc.) a power management controller (PMC) to assert a reset for the electronic device; and means for removing power such that the electronic device transitions to a cold state.

What is claimed is:

1. A system, comprising:
    a processor;
    a plurality of Peripheral Component Interconnect Express (PCIe) ports; and
    a memory to store instructions that, when executed by the processor, perform operations comprising
        evaluating the plurality of PCIe ports;
        in response to determining that a clock request (CLKREQ) pin associated with at least one of the plurality of the PCIe ports is not receiving a signal, disabling a squelch function associated with the system; and
        in response to determining that the CLKREQ pin is not receiving the signal, gating power associated with a physical layer (PHY) of the system for an unpopulated port of the plurality of PCIe ports.

2. The system of claim 1, wherein the clock request pin is used to detect a hot plug event to power up the PHY.

3. The system of claim 1, wherein the system is a mobile computing device configured to be docked at a docking station.

4. The system of claim 1, wherein a docking interconnect is included in the system.

5. The system of claim 1, wherein the plurality of PCIe ports are unpopulated and configured to perform the disabling the squelch function.

6. The system of claim 1, wherein a root port of the plurality of PCIe ports provides power to the PHY in response to the system being docked.

7. The system of claim 1, wherein a root port of the plurality of PCIe ports provides power to the PHY in response to the system being connected to an external monitor.

8. The system of claim 1, wherein the operations further comprise:
    enabling the squelch function, in response to determining that the CLKREQ pin is receiving a signal.

9. An apparatus to manage power for at least one processor, the apparatus comprising:
    a plurality of Peripheral Component Interconnect Express (PCIe) ports; and
    logic, the logic at least partially including hardware logic, to
        evaluate the plurality of PCIe ports;
        in response to determining that a clock request (CLKREQ) pin associated with at least one of the plurality of the PCIe ports is not receiving a signal, disable a squelch function associated with the apparatus; and
        in response to determining that the CLKREQ pin is not receiving the signal, gate power associated with a physical layer (PHY) of the apparatus for an unpopulated port of the plurality of PCIe ports.

10. The apparatus of claim 9, wherein the clock request pin is used to detect a hot plug event to power up the PHY.

11. The apparatus of claim 9, wherein the apparatus is a mobile computing device configured to be docked at a docking station.

12. The apparatus of claim 9, wherein a docking interconnect is included in the apparatus.

13. The apparatus of claim 9, wherein the logic enables the squelch function, in response to determining that the CLKREQ pin is receiving a signal.

14. A method implemented by an electronic device, the method comprising:
    evaluating a plurality of Peripheral Component Interconnect Express (PCIe) ports included in the electronic device;
    in response to determining that a clock request (CLKREQ) pin associated with at least one of the plurality of the PCIe ports is not receiving a signal, disabling a squelch function associated with the electronic device; and
    in response to determining that the CLKREQ in is not receiving the signal, gating power associated with a physical layer (PHY) of the electronic device for an unpopulated port of the plurality of PCIe ports.

15. The method of claim 14, wherein the clock request pin is used to detect a hot plug event to power up the PHY.

16. The method of claim 14, wherein the electronic device is a mobile computing device configured to be docked at a docking station.

17. The method of claim 14, wherein a docking interconnect is included in the electronic device.

18. The method of claim 14, further comprising:
    enabling the squelch function, in response to determining that the CLKREQ pin is receiving a signal.

* * * * *

UNITED STATES PATENT AND TRADEMARK OFFICE
CERTIFICATE OF CORRECTION

PATENT NO. : 9,513,662 B2  
APPLICATION NO. : 13/734612  
DATED : December 6, 2016  
INVENTOR(S) : Jennifer Chin et al.

Page 1 of 1

It is certified that error appears in the above-identified patent and that said Letters Patent is hereby corrected as shown below:

On the Title Page

In item (72), in Column 1, in "Inventors", Line 1, delete "Sugai Ara" and insert -- Sungai Ara --, therefor.

In item (72), in Column 1, in "Inventors", Line 3, delete "Seri Damansara" and insert -- Sri Damansara --, therefor.

In the Claims

In Column 14, Line 47, in Claim 14, after "CLKREQ" delete "in" and insert -- pin --, therefor.

Signed and Sealed this
Twenty-first Day of February, 2017

Michelle K. Lee
*Director of the United States Patent and Trademark Office*